Sept. 29, 1970      R. M. BYRNES, SR      3,530,530
SKEWER FOR CATTLE CARCASS
Filed April 2, 1969
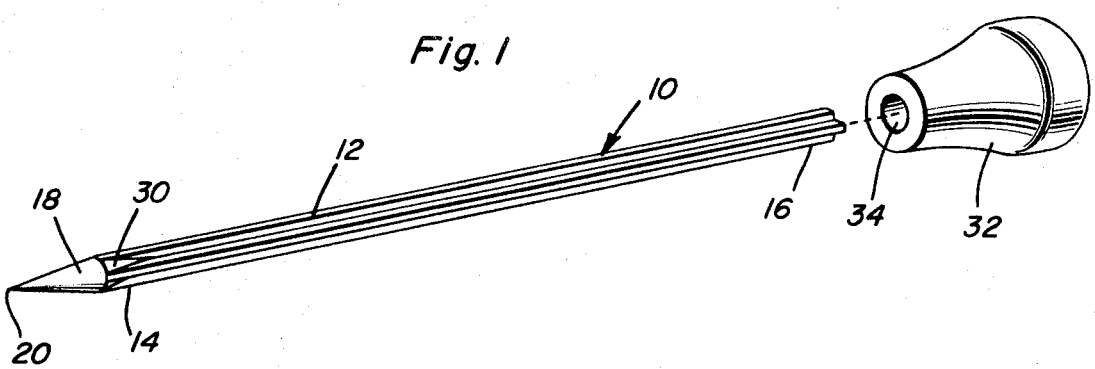
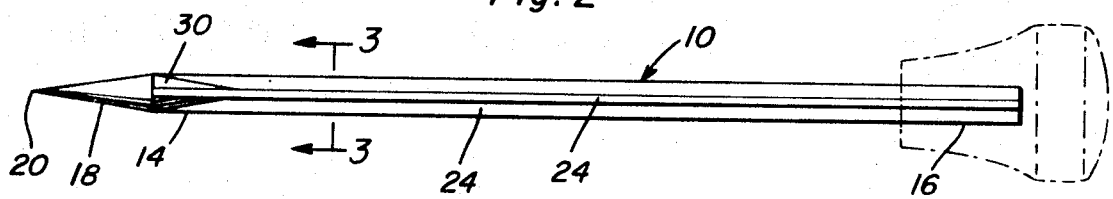
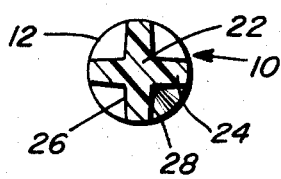
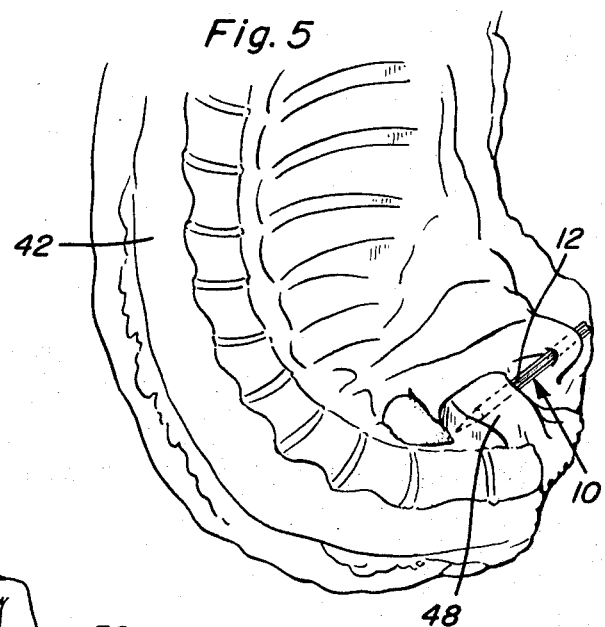
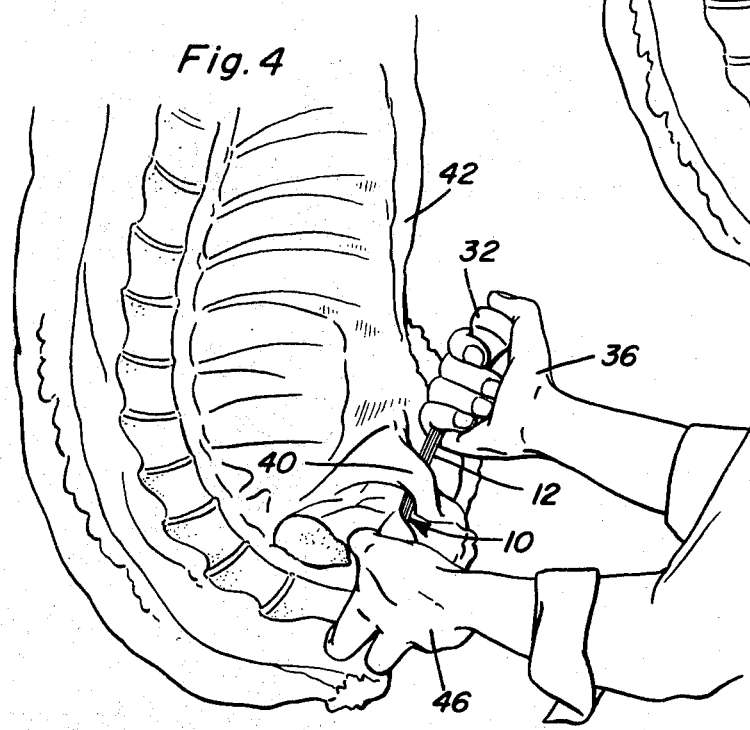
Robert M. Byrnes, Sr.
INVENTOR.
BY *Clarence A. O'Brien*
*and Harvey B. Jacobson*
Attorneys

United States Patent Office 3,530,530
Patented Sept. 29, 1970

3,530,530
SKEWER FOR CATTLE CARCASS
Robert M. Byrnes, Sr., 2440 Fontenelle Blvd.,
Omaha, Nebr. 68104
Filed Apr. 2, 1969, Ser. No. 826,743
Int. Cl. A47j 43/28
U.S. Cl. 17—1                           9 Claims

ABSTRACT OF THE DISCLOSURE

An elongated rod of tough material having high mechanical strength and which is stiff but somewhat flexible. The rod includes a pointed forward end terminating rearwardly in rearwardly tapering partial conical surfaces spaced about the rod and the rod is designed for use in pinning up various portions of hanging meats, such as the lower neck portion of a side of beef.

---

The skewer of the instant invention is defined by an elongated body constructed of stiff but resilient material. Although a rigid skewer could be utilized, the use of a stiff but somewhat bendable and resilient material has proven to be more desirable inasmuch as such an elongated body, when suitably pointed at its forward end, may be more readily forced through the meat which is to be pinned. The resiliency of the material of which the skewer of the instant invention is constructed enables the skewer to be slightly deflected about pieces or particles of bone or portions of the meat to be pinned which strongly resists penetration by the skewer and the utilization of a material such as a polypropylene or polystyrene has proven to be most beneficial in that the desired amount of stiffness coupled with the necessary resilience is provided without using a material that may adversely flavor, discolor or otherwise harm the immediately adjacent meat.

The skewer of the instant invention includes front and rear ends and the front end of the skewer includes a front or forward terminal end portion which is conical and tapers to a point at its forward end. Further, the skewer rearward of its conical forward terminal end, is provided with elongated and longitudinally extending and radially outwardly projecting ribs for non-slip engagement of the skewer with the meat so as to resist rotation of the skewer relative to the meat. In addition, the ribs, while affording strength to the forward longitudinal core of the body of the skewer, also render the body more flexible than it would be if constructed in the configuration of a solid cylindrical or other cross-sectional shaped rod.

Finally, the skewer, immediately adjacent and rearward of the conical forward terminal end, includes rearwardly and radially inclined wedge surfaces disposed intermediate the forward ends of adjacent rigs and which serve the purpose of resisting, while still enabling, rearward withdrawal of the skewer from a piece of meat. The radial outermost extremities of the ribs do not project outwardly of the major diameter end portion of the conical forward terminal end of the skewer, at least immediately adjacent the forward ends of the ribs, and the inclined wedge surfaces define circumferentially spaced conical segments.

The main object of this invention is to provide a meat skewer which may be readily handled and utilized to pin desired portions of slaughtered meat.

Another object of this invention, in accordance with the immediately preceding object, is to provide a meat skewer for pinning up desired portions of carcasses and which is constructed of a material, affording sufficient strength to the skewer and yet rendering the skewer somewhat flexible and resilient and free of properties which might adversely affect the meat to be pinned.

A final object of this invention to be specifically enumerated herein is to provide a meat skewer in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of the skewer of the instant invention shown with the handle forming knob thereof slightly axially displaced outwardly of the rear end of the skewer;

FIG. 2 is a side elevational view of the skewer;

FIG. 3 is an enlarged transverse sectional view of the body of the skewer;

FIG. 4 is a perspective view illustrating the manner in which the skewer may be manually forced through portions of a carcass for the purpose of pinning up a lower portion of the carcass; and FIG. 5 is a perspective view of the carcass illustrated in FIG. 4 with the skewer in position pinning up the lowermost portion of the carcass.

Referring more specifically to the drawings, the numeral 10 generally designates the skewer of the instant invention. The skewer 10 includes an elongated body 12 having a front end portion 14 and a rear end portion 16. The front end portion 14 of the body 12 includes a forward or front terminal end portion 18 that is conical in configuration and tapers to a point 20 at its forward end. The body 12, rearward of the forward terminal end portion 18, includes a center core 22 from which generally radial and longitudinally extending ribs 24 project. The ribs 24 are disposed on opposite ends of the diameters of the body 12 disposed at right angles relative to each other and each of the ribs 24 is generally rectangular in transverse cross-sectional shape, although the opposite longitudinal side walls 26 and 28 of each rib 24 are slightly inwardly divergent.

The forward end portion 14 of the body 12 includes rearwardly and inwardly inclined wedge surfaces 30 spaced circumferentially thereabout and defining circumferentially spaced conical segments. The wedge surfaces 30 are disposed between the forward ends of adjacent ribs 24.

A handle forming knob 32 is provided and includes a blind bore 34 into which the rear end portion 16 of the body 12 is snugly receivable. The knob 32 is of course utilized to force the body 12 forwardly through meat which is to be pinned.

The body 12 is of one-piece construction and constructed of a material having the general properties of poly-propylene or polystyrene. These materials afford sufficient rigidity to the body 12 to enable it to be utilized effectively in the manner intended. In addition, these materials, through the ribs 24, afford the body 12 sufficient resiliency whereby it may be readily forwardly inserted into the meat to be pinned. Still further, these materials may be utilized to pin meat without discoloring the meat being pinned, giving the adjacent meat an unusual flavor, or otherwise having an adverse effect upon the meat.

With attention now invited more specifically to FIGS. 4 and 5 of the drawings it may be seen that the knob 32 is placed upon the rear end portion 16 of the body 12 and held in one hand 36 while the skewer 10 has its forward end forced through a portion 40 of the carcass 42. Then, the other hand 46 picks up the end portion of the carcass 42 which is to be pinned up and holds it in position to be pierced by the forward end portion 18 of the body 12 as the skewer 10 is advanced forwardly. Of course, after the forward end portion 18 of the skewer 10 has been forced through a portion of the meat to be pinned up, the knob 32 is removed and the skewer 10 will then support the lower end portion 48 of the carcass 42 in a pinned up position in the manner illustrated in FIG. 5 of the drawings.

Further, while polystyrene may be used as the material from which the body 12 is constructed, in order to provide a body of greater strength the polystyrene may have glass fibers added thereto, as desired. Further, the skewer may be polygonal in cross sectional shape throughout a major portion of its length disposed rearward of the terminal end portion 18, with the exception of the wedge surfaces 30.

The conical forward terminal end portion 18 has a tendency to form a partial vacuum in the meat if rearward thrust is applied to the skewer 10 and the wedge surfaces 30 tend to spread the meat if the skewer is shifted rearwardly relative to meat in which the terminal end portion 18 is engaged. Thus, the tapering end portion 18 coacts with the wedge surfaces 30 to resist rearward withdrawal of the skewer 10 from meat. Also, this is accomplished without any portions of the skeer 10 tending to tear adjacent meat and there are no full right angle inside corners in which meat particles may collect or build up. Further there are no surfaces of the skewer 10 disposed even generally normal to the centerline of the skewer to have particles of meat collect thereon.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A skewer for pinning up portions of cattle carcasses, said skewer including an elongated body constructed of stiff but bendable and resilient material, said body including a front end portion and a rear end portion, said front end portion including a forward terminal end which tapers forwardly to a forward point, said front end portion also including a plurality of inclined wedge surfaces spaced disposed thereabout and inclined rearwardly and generally inwardly toward, but terminating a spaced distance radially outwardly of the longitudinal center axis of said body, the inclined wedge surfaces being disposed rearward and closely adjacent the rear major diameter end of said forward terminal end.

2. The combination of claim 1 wherein said body, rearwardly of said conical terminal end includes a plurality of elongated longitudinally extending ribs spaced circumferentially thereabout and which project generally radially outwardly of the longitudinal center axis of said body.

3. The combination of claim 1 wherein said body, rearwardly of said conical terminal end includes a plurality of elongated longitudinally extending ribs spaced circumferentially thereabout and which project generally radially outwardly of the longitudinal center axis of said body, said wedge surfaces being disposed between the forward ends of said ribs.

4. The combination of claim 3 wherein said wedge surfaces define circumferentially spaced partial conical surfaces.

5. The combination of claim 1 wherein said body, rearwardly of said conical terminal end includes a plurality of elongated longitudinally extending ribs spaced circumferentially thereabout and which project generally radially outwardly of the longitudinal center axis of said body, said ribs being generally rectangular in cross-sectional shape and lying on opposite end portions of selected diameters of said body.

6. The combination of claim 5 wherein said diameters are two in number and disposed at right angles relative to each other.

7. The combination of claim 1 wherein said body, rearwardly of said conical terminal end includes a plurality of elongated longitudinally extending ribs spaced circumferentially thereabout and which project generally radially outwardly of the longitudinal center axis of said body, said ribs being generally rectangular in cross-sectional shape and lying on opposite end portions of selected diameters of said body, the opposite longitudinal sides of said ribs being slightly inwardly divergent.

8. The combination of claim 1 wherein said body is constructed of plastic material having the general properties of polystyrene.

9. The combination of claim 1 including a removable handle forming knob for the rear end of said body, said knob including a blind bore in which the rear terminal end portion of said body is snugly and removably telescopingly seated.

References Cited

UNITED STATES PATENTS

| 623,571 | 4/1899 | Shipe. | |
| 2,488,362 | 11/1949 | Wiur | 146—216 |
| D. 186,902 | 12/1959 | Fried. | |
| 3,339,478 | 9/1969 | Crow | 99—355 |

FOREIGN PATENTS

| 176,681 | 3/1922 | Great Britain. |

LUCIE H. LAUDENSLAGER, Primary Examiner

U.S. Cl. X.R.

99—355; 146—216